UNITED STATES PATENT OFFICE.

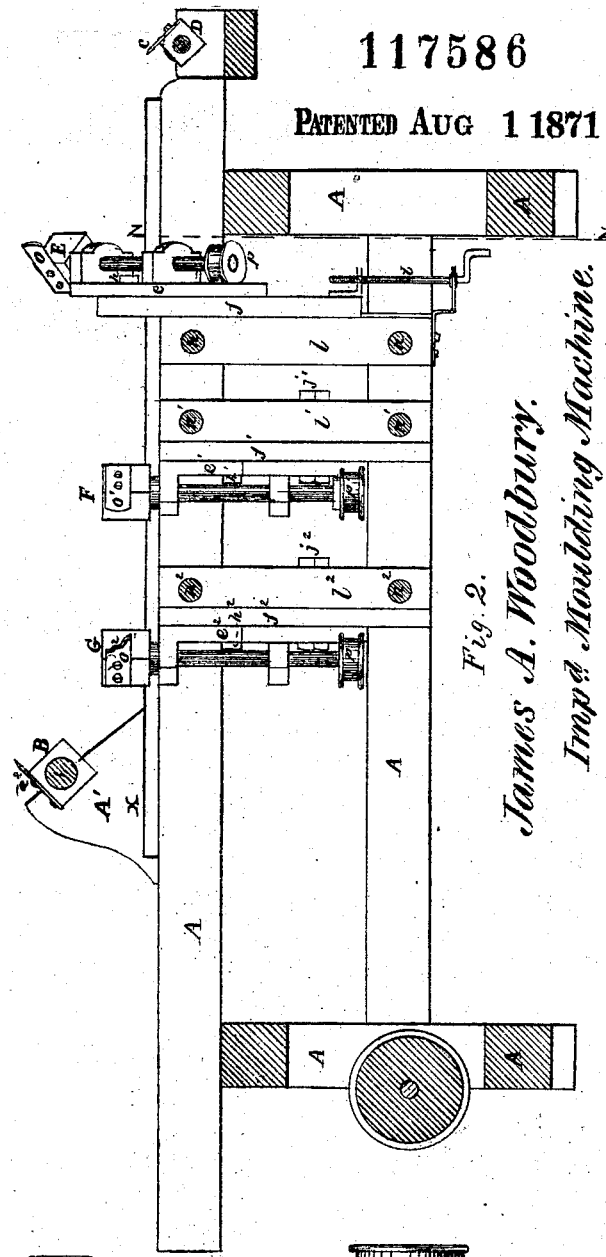
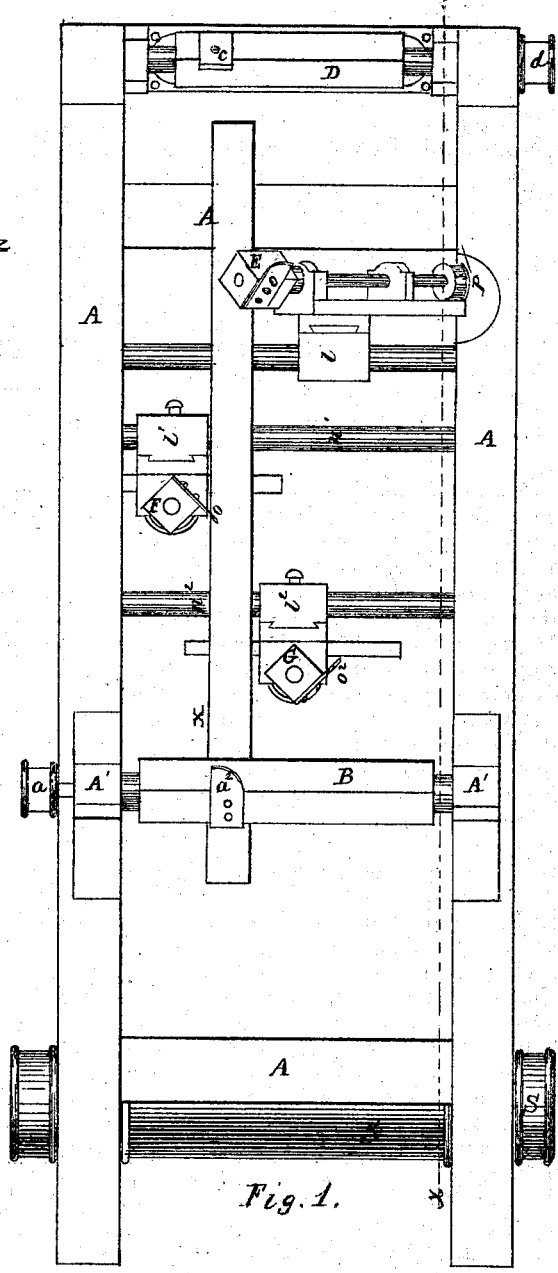
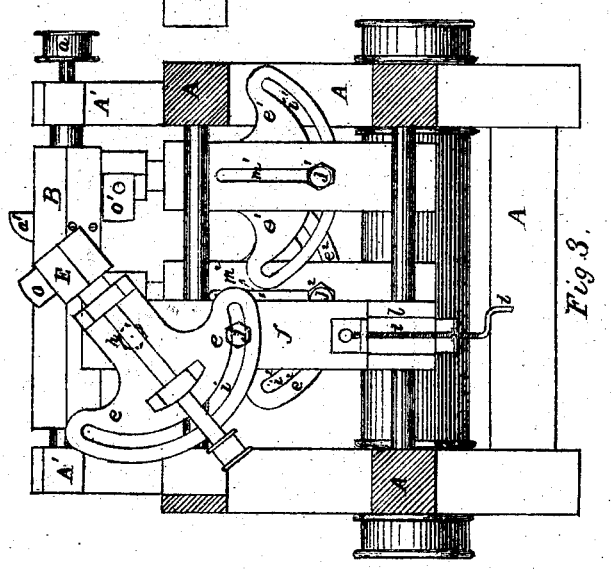
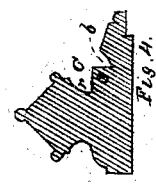
James A. Woodbury.
Improved Moulding Machine.
No. 117586. Patented Aug 1 1871.
Inventor.
James A. Woodbury
Witnesses.
N. C. Lombard
G. E. Whitney

JAMES A. WOODBURY, OF BOSTON, MASSACHUSETTS.

IMPROVEMENT IN MOLDING-MACHINES.

Specification forming part of Letters Patent No. 117,586, dated August 1, 1871.

*To all whom it may concern:*

Be it known that I, JAMES A. WOODBURY, of Boston, in the county of Suffolk and State of Massachusetts, have invented certain new and useful Improvements in Molding-Machines, of which the following is a description:

My invention relates to a machine in which revolving cutters are arranged in a manner too fully described hereafter to need preliminary explanation, so as to cut all the faces of a strip of molding and form an "under-cut" recess therein at one passage of the strip through the machine.

Figure 1 is a plan of a machine embodying my improvements. Fig. 2 is a vertical longitudinal section on line $x\ x$, Fig. 1. Fig. 3 is a vertical transverse section on line $z\ z$, Fig. 1. Fig. 4 represents, in cross-section, a molding in a partially-completed state; and Fig. 5 is a cross-section of the same molding completed.

A is the frame of the machine, and B is a cutter-head provided with the pulley $a$ and mounted in suitable bearings A' on the frame and carrying the cutter $a^2$, arranged to cut that portion of the concave member C of the molding marked $b$, Fig. 4, the strip of wood from which a molding is to be formed being fed under said cutter on a bed, X, arranged in a horizontal position and supplied with suitable side bearings, feed-rolls, and pressure-rolls, not shown in the drawing. D is a cutter-head carrying the cutter $c$, arranged to plane the under side of the strip of lumber, which is fed under a bed arranged above said cutter. A pulley, $d$, is secured on the outer end of the shaft of the cutter-head D for imparting motion thereto by a belt from the drum S. E, F, and G are cutter-heads mounted in suitable bearings on the frames $e$, $e^1$, and $e^2$, which are pivoted to the slides $f$, $f^1$, and $f^2$ by the axial pins $h$, $h^1$, and $h^2$, and are provided with the segmental slots $i$, $i^1$, and $i^2$, through which the clamping-bolts $j$, $j^1$, and $j^2$ pass, by which said frames and cutter-heads are secured at any desired angle. The slides $f$, $f^1$, and $f^2$ are fitted to move in dovetailed grooves in the bed-pieces $l$, $l^1$, and $l^2$, and are secured at any desired point thereon by the clamping-bolts $j$, $j^1$, and $j^2$, which pass through the slots $m$, $m^1$, and $m^2$ formed therein. The bed-pieces $l$, $l^1$, and $l^2$ are mounted on the bearing-rods or bars $n$, $n^1$, and $n^2$, extending transversely across the machine, and so located that the several cutters are brought into action upon the material in succession, or one after the other, and may be adjusted to any desired position thereon, though it is intended as a general thing to work E and G on one side of the molding and F on the other. These cutter-heads carry the cutter $o$, $o^1$, and $o^2$, and are driven by belts from the drum S onto the pulleys $p$, $p^1$, and $p^2$. The cutter-heads E and G are designed to work in combination with the upper cutter-head B to cut out the concave member C of the molding, the cutter $a^2$ on B cutting out that portion marked $b$, Fig. 4, and the cutter $o^2$ on G cutting out the portion marked $r$, the axis of G being held in a vertical position.

The axis of E is adjusted to the proper angular position for the cutter $o$ thereon to cut out that portion of the molding marked $s$, which is usually cut by hand.

It will be seen that, by the above-described arrangement, all the faces of the strips are cut at one passage of the same through the machine, while at the same time the under-cut recess—that is, a recess beneath some projecting part, as shown at C, Fig. 5—is also cut, the molding thus leaving the machine in a complete state, ready to be smoothed and finished.

The cutters $o$ and $o^2$, if both are made so that they may be adjusted vertically, horizontally, and at an angle, may cut the whole of the member C and dispense with the cutter $a^2$, or allow that to be used for cutting some other member of the molding.

By this construction and arrangement of the cutters and their appendages either of the cutters $o$, $o^1$, and $o^2$ may be adjusted to cut upon either side of the molding and at any desired angle between a perpendicular and an angle of forty-five degrees and at any desired height, which is a very desirable point in cutting such a molding, as is shown in Fig. 5.

$t$ is an adjusting-screw, by means of which the slide $f$ is moved up or down on the bed-piece $l$.

Having thus fully set forth my invention, what I claim, and desire to secure by Letters Patent of the United States, is as follows:

The rotary cutter-heads B D E F G, frame A, and bed X, and the adjusting devices specified, or their equivalents, when arranged and operating in the manner and for the purpose substantially as shown and described.

Executed at Boston this 26th day of June, 1871.

JAMES A. WOODBURY.

Witnesses:
G. E. WHITNEY,
N. C. LOMBARD.